United States Patent Office 2,866,778
Patented Dec. 30, 1958

2,866,778

NEW THIAZOLINE AND THIAZOLE ACCELERATORS

Richard Leshin, Akron, Ohio, assignor to The Goodyear Tire & Rubber Company, Akron, Ohio, a corporation of Ohio No Drawing. Application August 4, 1955
Serial No. 526,564

18 Claims. (Cl. 260—79.5)

This invention relates to the vulcanization of rubber. More particularly this invention relates to new compounds which are accelerators of vulcanization of rubber.

It is an object of this invention to provide rapid vulcanization of rubber while avoiding scorching. It is another object to provide improved compositions for vulcanizing rubber. It is another object to provide a new class of compounds which accelerate the vulcanization of rubber. Other objects will appear hereinafter as the description of the invention proceeds.

According to this invention the acceleration of the vulcanization of rubber with sulfur is produced by heating rubber and sulfur in the presence of an ester of a compound of the general formula HOOC—Ar—S—S—T in which Ar is an arylene radical, and T represents a thiazolyl or thiazolinyl radical. These compounds are esters of carboxy arylene dithio thiazoles and carboxy arylene dithio thiazolines.

The accelerators of this invention can be prepared by reacting a sodium or potassium salt of a 2-mercaptothiazole or a sodium or potassium salt of a 2-mercaptothiazoline with an ester of a carboxy arylene sulfenyl chloride.

The sulfenyl chloride may conveniently be prepared by passing dry chlorine into a suspension or slurry of an ester of a bis(carboxy arylene) disulfide as illustrated in Example 1 below in which o,o'-dimethyl dithiodibenzoate is used as a representative starting material.

EXAMPLE 1

Chlorine gas was passed over a suspension of 33.5 grams of o,o'-dimethyl dithiodibenzoate in 250 milliliters of benzene, with occasional shaking. When 10 grams had been absorbed, the chlorine was disconnected, and the reaction mixture was allowed to stand over night under a calcium chloride drying tube. The resultant sollution was then vacuum-distilled until there was no more chlorine in the distillate. The volume of the residue was 136 milliliters, and contained 0.2 mol of o-carbomethoxybenzenesulfenyl chloride.

Example 2 illustrates the preparation of a representative compound of this invention.

EXAMPLE 2

A benzene solution containing 0.1 mol of o-carbomethoxybenzenesulfenyl chloride prepared by the method of Example 1 above was slowly added to a filtered solution of 0.1 mol of the sodium salt of 2-mercaptobenzothiazole dissolved in 75 milliliters of water. The solutions were stirred while being mixed together and agitation was continued for 15 minutes after all of the sulfenyl chloride had been added. The benzene layer was separated from the aqueous layer, transferred to a distilling flask and the benzene was distilled off under vacuum. The residual black oil was triturated with alcohol. The product solidified and was washed and dried. After recrystallization it had a melting point of 86 to 87° C., and on analysis was found to contain 28.43% of sulfur and 4.20% of nitrogen. The theoretical sulfur and nitrogen contents of 2-(o-carbomethoxyphenyldithio)-benzothiazole are 28.85% and 4.20% respectively.

Other accelerators of this invention, i. e. esters of compounds having the general formula HOOC—Ar—S—S—T in which Ar is an arylene radical and T represents a thiazolyl or thiazolinyl radical, can be prepared in a similar manner by appropriate selection of starting materials. While the phenylene compounds constitute a preferred class, Ar may be any other arylene radical such as the various naphthylene radicals. In addition to the parent compounds, various substituted compounds containing substituents on the arylene, thiazole and thiazoline rings can also be used. The dithio group can be ortho, meta or para to the ester group. Various esters can be used, including aliphatic, aromatic, aralkyl, cycloaliphatic and other esters. Representative examples are methyl, ethyl, propyl, butyl, secondary butyl, amyl isoamyl, octyl, 2-ethylhexyl, beta-chloroethyl, beta-cyanoethyl, beta-butoxyethyl, cyclohexyl, benzyl, phenyl, tolyl, chlorophenyl, nitrophenyl and methoxyphenyl esters. The alkyl esters constitute a preferred class. Representative examples of thiazolyl radicals are 2-thiazolyl, 4,5-dimethyl-2-thiazolyl, 4,5-diethyl-2-thiazolyl, 4-methyl-2-thiazolyl, 4-ethyl-2-thiazolyl, 4 - butyl - 2 - thiazolyl, 5 - ethyl - 2 - thiazolyl, 4 - phenyl - 2 - thiazolyl, 2 - benzothiazolyl, 2 - naphthothiazolyl, 6-chloro-2-benzothiazolyl, 4-ethoxy-2-benzothiazolyl, 6-phenyl-2-benzothiazolyl, 6-nitro-2-benzothiazolyl, 4-methyl-2-benzothiazolyl, 5-ethyl-2-benzothiazolyl, and 6-tertiarybutyl-2-benzothiazolyl. Representative examples of thiazolinyl radicals are 2-thiazolinyl, 4-methyl-2-thiazolinyl, 4,4-dimethyl-2-thiazolinyl, 4,5-dimethyl-2-thiazolinyl, 5-phenyl-2-thiazolinyl and 4-ethyl-2-thiazolinyl.

Further representative compounds are 2-(o-carbomethoxyphenyldithio)-benzothiazole, 2-(o-carbethoxyphenyldithio)-benzothiazole, 2-[β-(α-carbomethoxynaphthyl)dithio]-benzothiazole, 2-(o-carbomethoxy-p-chlorophenyldithio)-benzothiazole, 2-(o-carbisopropoxyphenyldithio)-benzothiazole, 2 - [o - carbo - (β - chloroethoxy) - phenyldithio] - benzothiazole, 2 - [o - carbo - (β - cyanoethoxy)-phenyldithio] - benzothiazole, 2 - [o - carbo - (β - butoxyethoxy)phenyldithio]-benzothiazole, 2-(o-carbophenoxyphenyldithio) - benzothiazole, 2 - (o - carbethoxyphenyldithio)-6-chlorobenzothiazole, 2-(o-carbethoxy-p-chlorophenyldithio)-6-chlorobenzothiazole, 2-(o-carbomethoxyphenyldithio)-thiazole, 2-(o-carbophenoxyphenyldithio)-thiazole, 2-(o-carbomethoxyphenyldithio)-4,5-dimethylthiazole, 2-(o-carbethoxyphenyldithio)-4-phenylthiazole, 2-(o-carbopropoxyphenyldithio)-4,5-dimethylthiazole, 2-(o-carbo-secondary butoxyphenyldithio)-4,5-dimethylthiazole, 2-[o-carbo-(β-chloroethoxy)phenyldithio]-4,5-dimethylthiazole, 2-[o-carbo(β-cyanoethoxy)phenyldithio]-4,5-dimethylthiazole, 2-[o-carbo(β-butoxyethoxy)phenyldithio]-4,5-dimethylthiazole, 2-(o-carbophenoxyphenyldithio)-4,5-dimethylthiazole, 2-(o-carbophenoxyphenyldithio)-4-phenylthiazole, 2-(o-carbomethoxyphenyldithio)-thiazoline, 2-[β-(α-carbomethoxynaphthyl)dithio]-thiazoline, 2-(o-carbomethoxy-p-chlorophenyldithio)-6-chlorothiazoline, 2-(carbisopropoxyphenyldithio)-thiazoline, 2-(o-carbophenoxyphenyldithio)-thiazoline, and 2-(o-carbo-p-toloxyphenyldithio)-4-ethylthiazoline. The corresponding meta and para compounds can also be used.

The efficacy of the compounds in the vulcanization of rubber is illustrated by the following examples, employing representative compounds of the invention in comparison with the commercial accelerator N-oxydiethylene-2-benzothiazolesulfenamide in a standard test recipe. The test recipe is shown as Table 1 below in which the parts are parts by weight. The ingredients were mixed on a small two-roll laboratory mill according to usual compounding procedure.

Table 1

|  | Stock No. | | | |
| --- | --- | --- | --- | --- |
|  | A | B | C | D |
| Smoked sheet | 100 | 100 | 100 | 100 |
| Carbon black | 50 | 50 | 50 | 50 |
| Stearic acid | 3.0 | 3.0 | 3.0 | 3.0 |
| Softener | 5.0 | 5.0 | 5.0 | 5.0 |
| Zinc oxide | 3.0 | 3.0 | 3.0 | 3.0 |
| Sulfur | 2.5 | 2.5 | 2.5 | 2.5 |
| Antioxidant | 1.0 | 1.0 | 1.0 | 1.0 |
| N-Oxydiethylene-2-benzothiazole-sulfenamide | 0.45 | | | |
| 2-(o-carbomethoxyphenyldithio)-benzothiazole | | 1.5 | | |
| 2-(o-carbethoxyphenyldithio)-benzothiazole | | | 1.5 | |
| 2-(o-carbomethoxyphenyldithio)-thiazoline | | | | 1.3 |

Samples of the above stocks were cured at 275° F. and tested for tensile strength and for modulus at 300% elongation. The physical properties are listed in Table 2 below:

Table 2

| Cure in Minutes at 275° F. | Ultimate Tensile Strength in Pounds Per Square Inch | | | |
| --- | --- | --- | --- | --- |
|  | Stock No. | | | |
|  | A | B | C | D |
| 15 | 1,120 | | | 700 |
| 30 | 3,600 | 3,170 | 3,570 | 3,060 |
| 45 | 3,760 | 3,400 | 3,890 | 3,460 |
| 60 | 3,805 | 3,600 | 3,800 | 3,550 |
| | Ultimate Elongation in percent | | | |
| 15 | 440 | | | 440 |
| 30 | 560 | 560 | 620 | 560 |
| 45 | 510 | 500 | 570 | 540 |
| 60 | 500 | 490 | 550 | 510 |
| | Modulus at 300% Elongation | | | |
| 15 | 600 | | | 350 |
| 30 | 1,800 | 1,350 | 1,350 | 1,350 |
| 45 | 2,050 | 1,800 | 1,750 | 1,800 |
| 60 | 2,200 | 2,050 | 2,850 | 1,950 |

The compounds of this invention are effective accelerators of vulcanization of rubber and stocks containing these accelerators have good resistance to scorching. In addition, the compounds of this invention have good chemical stability. This is particularly advantageous when the accelerator is likely to be stored for some time before it is used.

The invention has been illustrated above with respect to the use of the compounds of this invention as accelerators of vulcanization of natural rubber. They can also be used to accelerate the vulcanization of synthetic rubbers. Representative examples of such synthetic rubbers are polybutadiene, polyisoprene, the rubbery butadiene-acrylonitrile copolymers, rubbery butadiene-isobutylene copolymers, rubbery butadiene-styrene copolymers, rubbery butadiene-vinylpyridine copolymers, and various other rubbery copolymers of diene hydrocarbons with another monomer copolymerizable therewith.

The amount of accelerator and the curing conditions used in the examples are shown for purposes of illustration. The curing conditions can be varied over the usual range used in the sulfur vulcanization of rubber. The other compounding ingredients also can be varied and other materials such as pigments, plasticizers, extenders, oils and waxes can also be incorporated in the compositions.

While certain representative embodiments and details have been shown for the purpose of illustrating the invention, it will be apparent to those skilled in this art that various changes and modifications may be made therein without departing from the spirit or scope of the invention.

I claim:
1. The method which comprises heating a rubber selected from the group consisting of natural rubber, polybutadiene, polyisoprene and rubbery copolymers of diene hydrocarbons with another monomer copolymerizable therewith and sulfur in the presence of an ester selected from the group consisting of aliphatic esters, aromatic esters, aralkyl esters and cycloaliphatic esters of a compound having the general formula HOOC—Ar—S—S—T in which Ar is an arylene radical and T is selected from the group consisting of 2-thiazolyl and 2-thiazolinyl radicals.

2. The method of claim 1 in which the arylene group is phenylene and the dithio group is in the position ortho to the ester group.

3. The method of claim 2 in which T is 2-benzothiazolyl.

4. The method of claim 3 in which the ester is the methyl ester.

5. The method of claim 3 in which the ester is the ethyl ester.

6. The method of claim 2 in which T is 2-thiazolinyl.

7. The method of claim 6 in which the ester is the methyl ester.

8. A vulcanizable composition comprising a rubber selected from the group consisting of natural rubber, polybutadiene, polyisoprene and rubbery copolymers of diene hydrocarbons with another monomer copolymerizable therewith, sulfur and an ester selected from the group consisting of aliphatic esters, aromatic esters, aralkyl esters and cycloaliphatic esters of a compound of the general formula HOOC—Ar—S—S—T in which Ar is an arylene radical and T is selected from the group consisting of 2-thiazolyl and 2-thiazolinyl radicals.

9. A vulcanizable composition comprising a rubber selected from the group consisting of natural rubber, polybutadiene, polyisoprene and rubbery copolymers of diene hydrocarbons with another monomer copolymerizable therewith, sulfur, and 2-(o-carbomethoxyphenyldithio)-benzothiazole.

10. A vulcanizable composition comprising a rubber selected from the group consisting of natural rubber, polybutadiene, polyisoprene and rubbery copolymers of diene hydrocarbons with another monomer copolymerizable therewith, sulfur, and 2-(o-carbethoxyphenyldithio)-benzothiazole.

11. A vulcanizable composition comprising a rubber selected from the group consisting of natural rubber, polybutadiene, polyisoprene and rubbery copolymers of diene hydrocarbons with another monomer copolymerizable therewith, sulfur, and 2-(o-carbomethoxyphenyldithio)-thiazoline.

12. A rubber product which has been vulcanized in the presence of an ester selected from the group consisting of aliphatic esters, aromatic esters, aralkyl esters and cycloaliphatic esters of a compound of the general formula HOOC—Ar—S—S—T in which Ar is an arylene radical and T is selected from the group consisting of 2-thiazolyl and 2-thiazolinyl radicals.

13. As a new compound 2-(o-carbomethoxyphenyldithio)-benzothiazole.

14. As a new compound 2-(o-carbethoxyphenyldithio)-benzothiazole.

15. As a new compound 2-(o-carbomethoxyphenyldithio)-thiazoline.

16. As new compounds, the esters of compounds having the general formula HOOC—Ar—S—S—T in which Ar is an arylene radical and T is selected from the group consisting of 2-thiazolyl and 2-thiazolinyl radicals.

17. As a new compound, an ester of a 2-(carboxyphenyldithiothiazole).

18. As a new compound an ester of a 2-(carboxyphenyl-dithiothiazoline).

References Cited in the file of this patent

UNITED STATES PATENTS

| | | |
|---|---|---|
| 1,769,423 | Eder | July 1, 1930 |
| 2,064,395 | Tschunkur | Dec. 15, 1936 |
| 2,415,627 | Cooper | Feb. 11, 1947 |
| 2,461,953 | Bargmeyer | Feb. 15, 1949 |
| 2,666,043 | Carr | Jan. 12, 1954 |
| 2,667,503 | Senn | Jan. 26, 1954 |
| 2,746,970 | D'Amico | May 22, 1956 |
| 2,756,238 | D'Amico | July 24, 1956 |
| 2,760,933 | Fields | Aug. 28, 1956 |
| 2,782,139 | Hill | Feb. 19, 1957 |

UNITED STATES PATENT OFFICE
CERTIFICATE OF CORRECTION

Patent No. 2,866,778                        December 30, 1958

Richard Leshin

It is hereby certified that error appears in the printed specification of the above numbered patent requiring correction and that the said Letters Patent should read as corrected below.

Column 1, line 49, for "sollution" read -- solution --; column 3, line 34, Table 2, second column thereof, under the heading Stock No. A, for "3,805" read -- 3,850 --; same Table 2, line 45, fourth column thereof, under the heading Stock No. C, for "2,850" read -- 1,850 --.

Signed and sealed this 5th day of May 1959.

(SEAL)

Attest:

KARL H. AXLINE                               ROBERT C. WATSON

Attesting Officer                              Commissioner of Patents